United States Patent Office 3,428,799
Patented Feb. 18, 1969

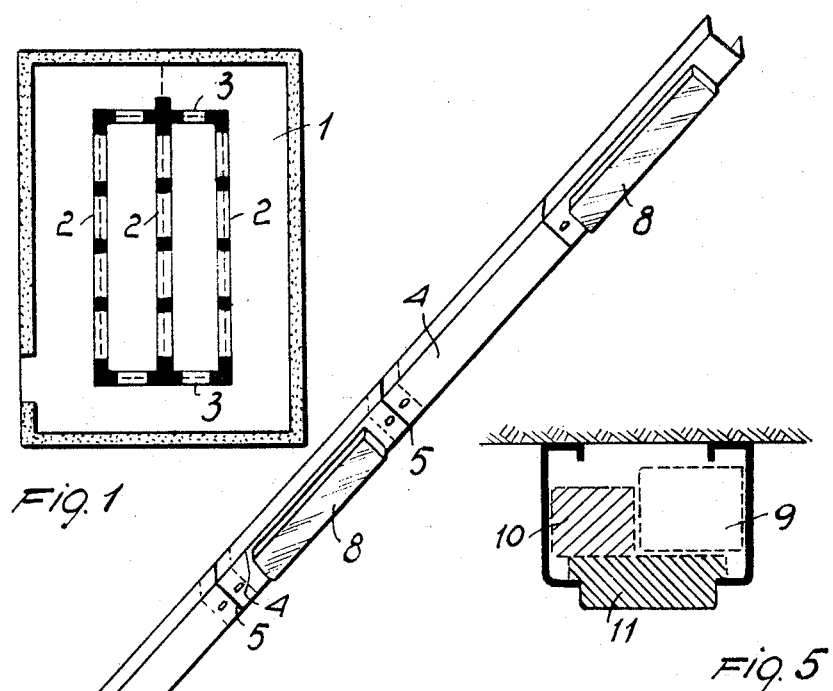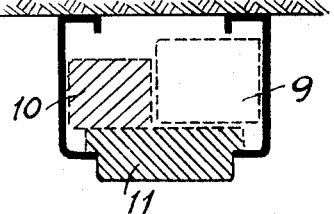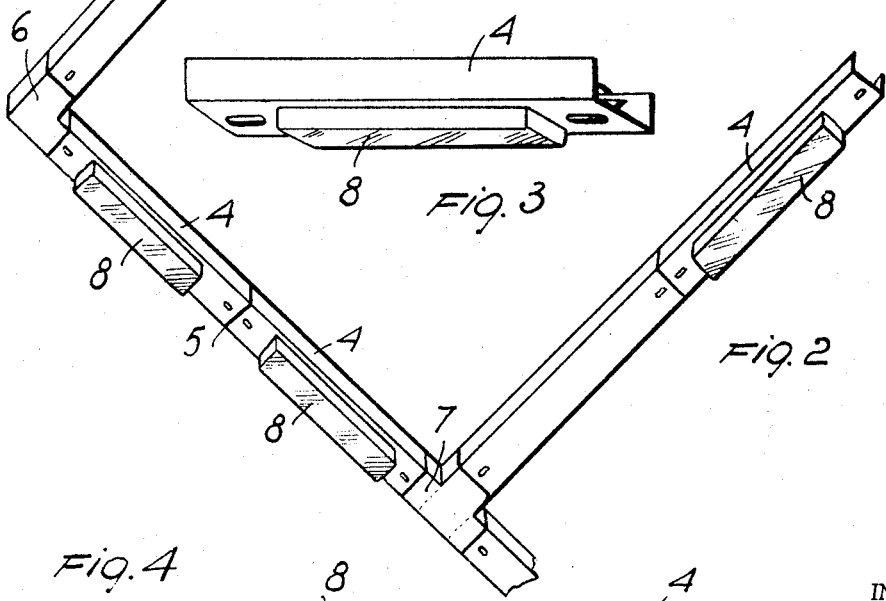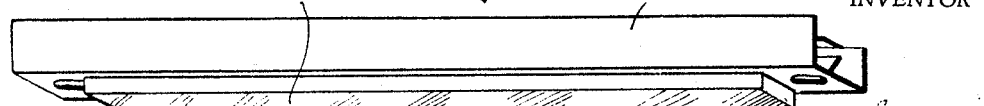

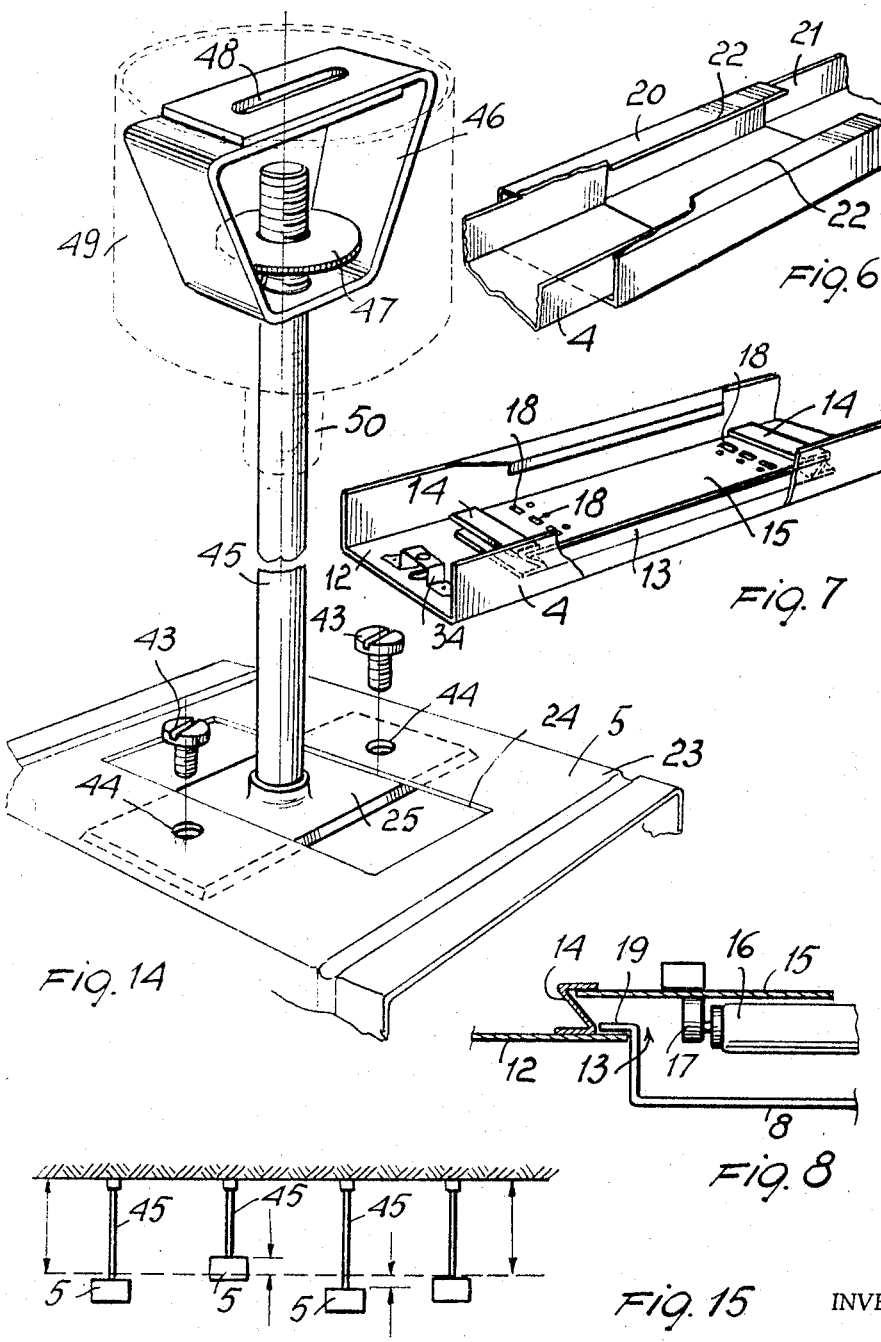

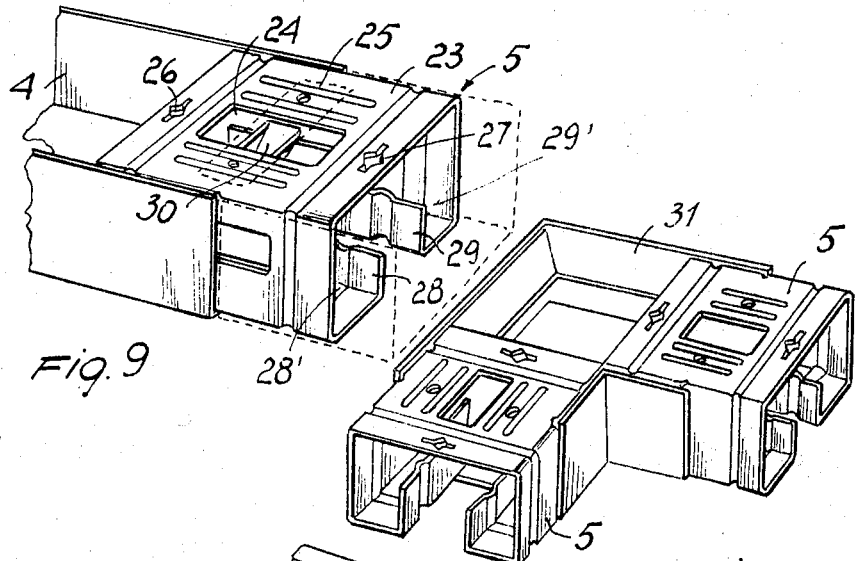
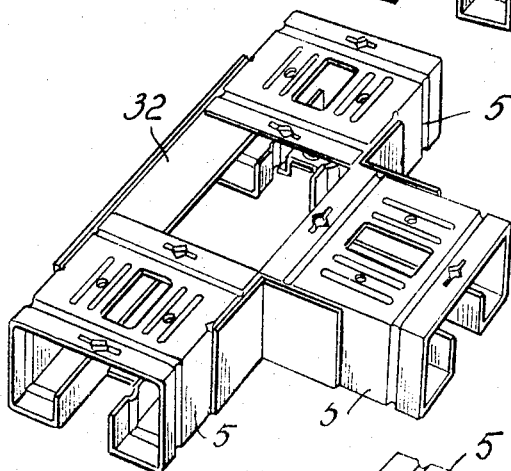
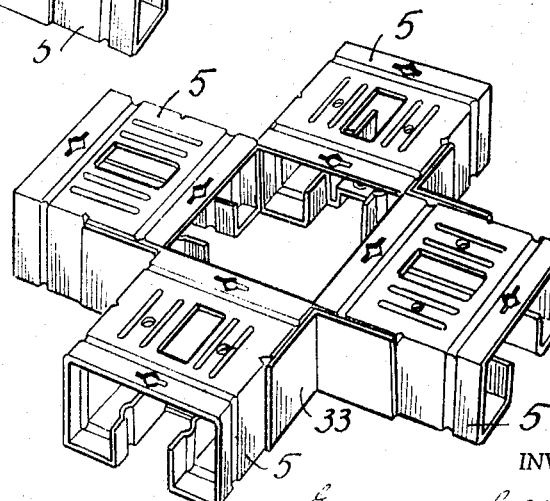

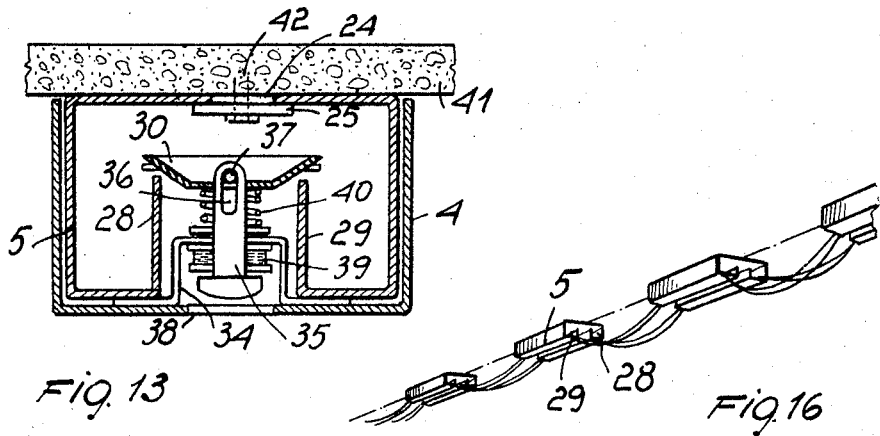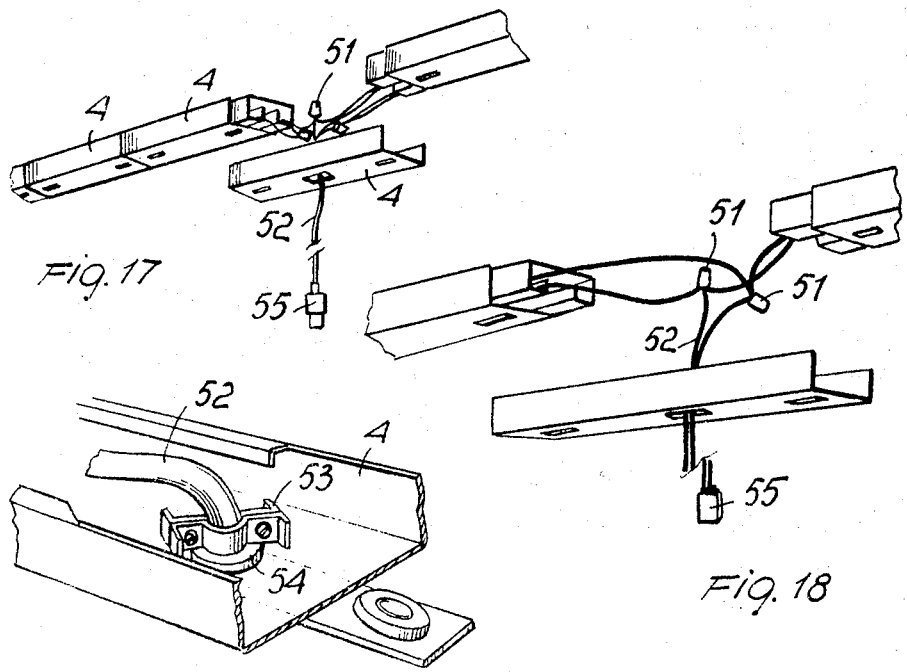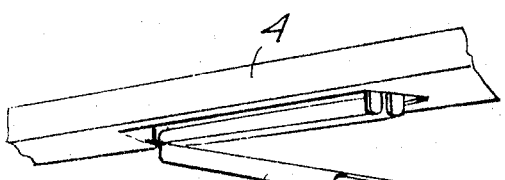

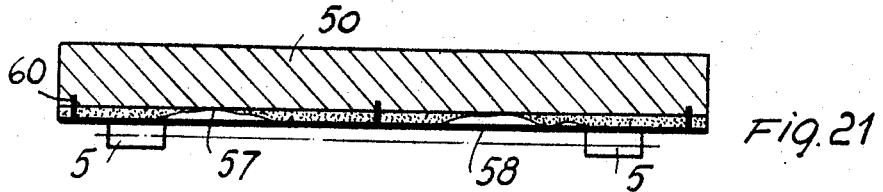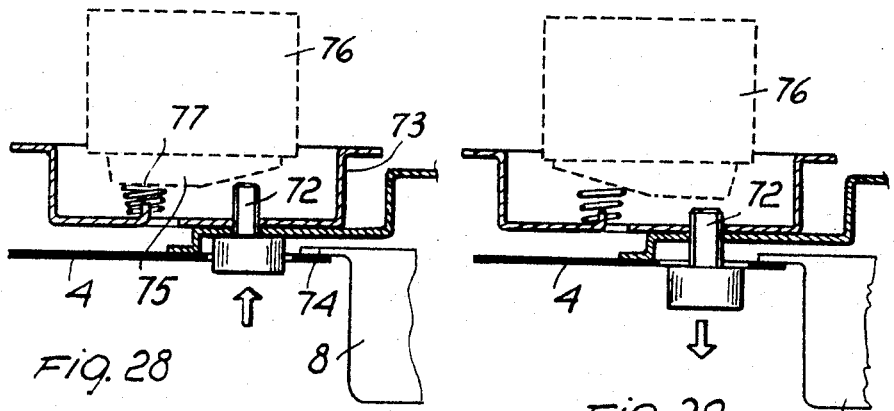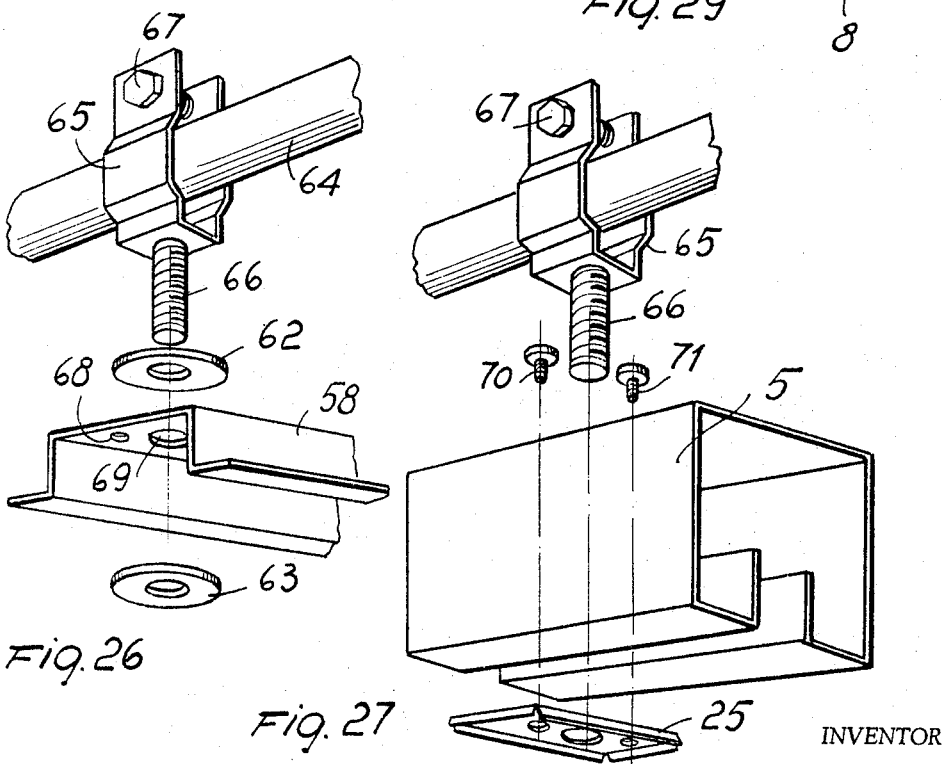

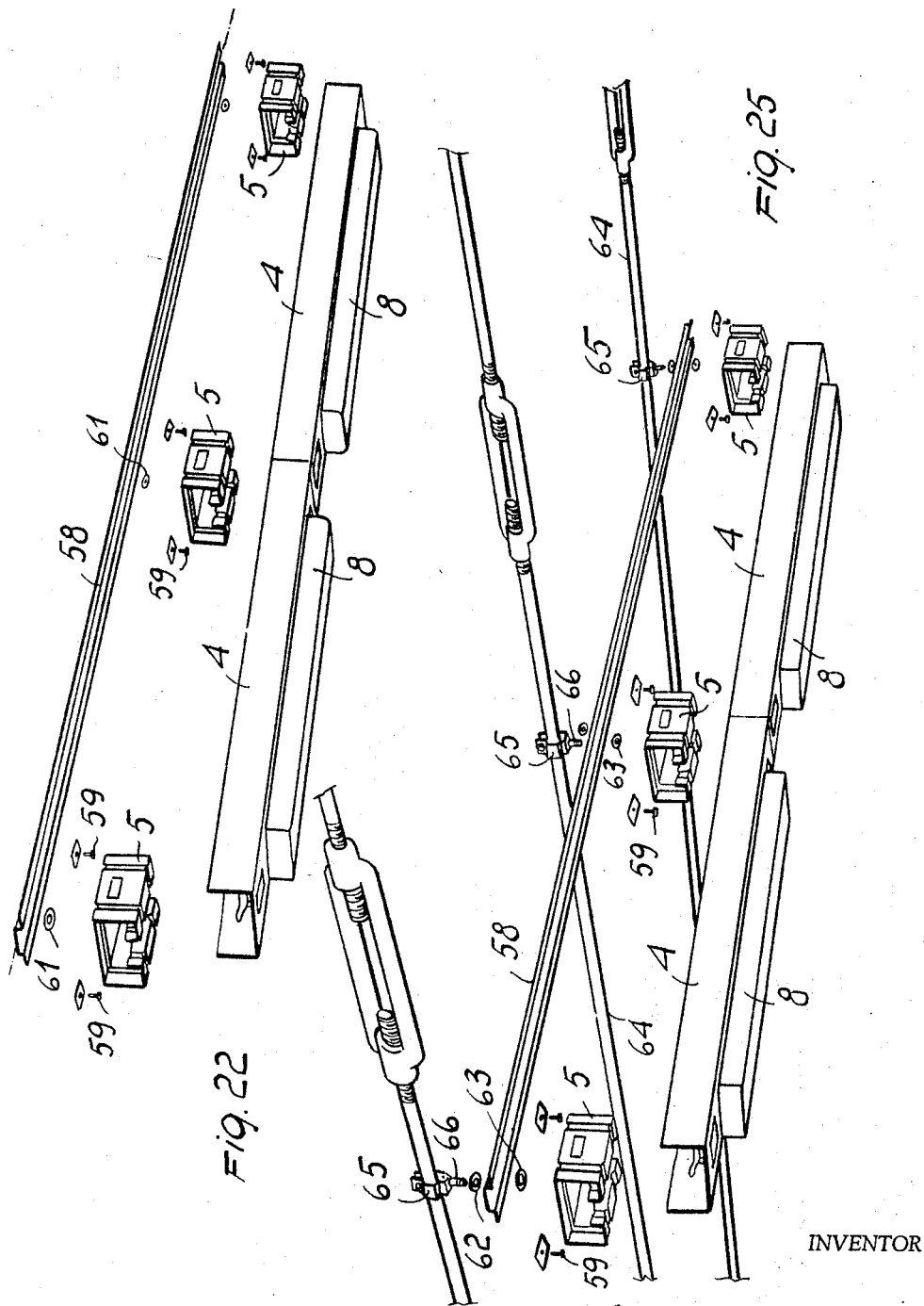

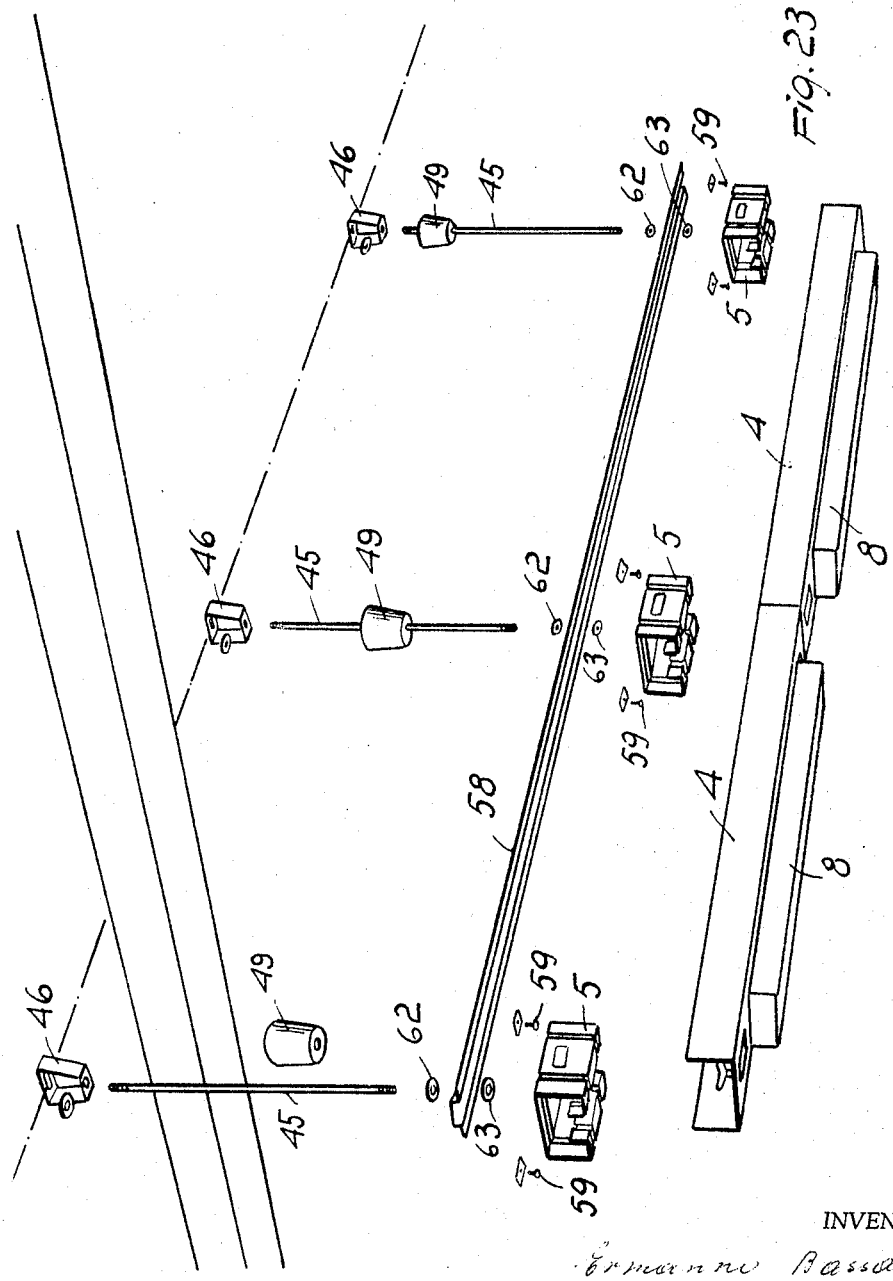

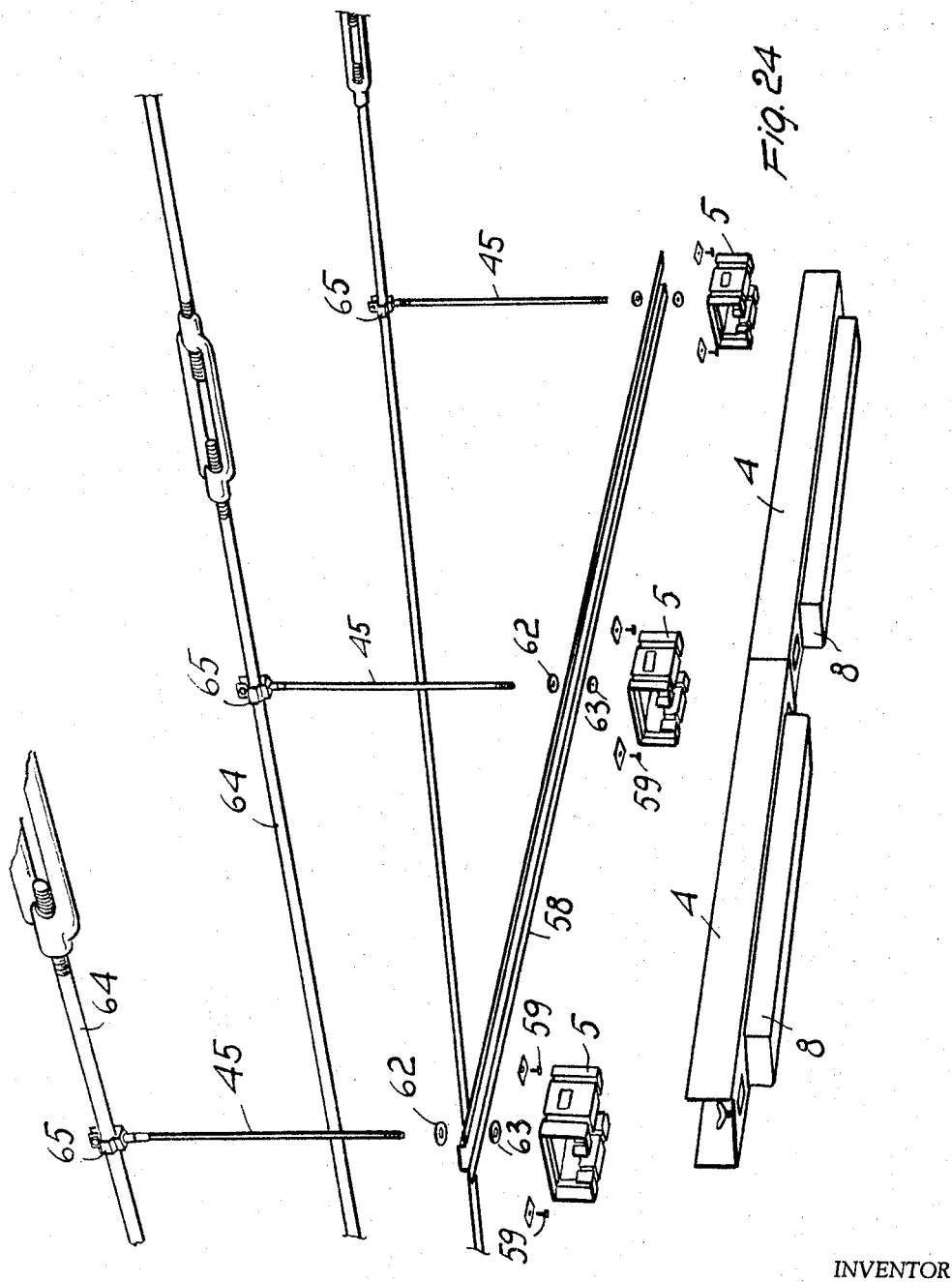

3,428,799
ELECTRICITY DISTRIBUTING LINES
Ermanno Bassani, Corso Porta Vittoria, 9, Milan, Italy
Filed Dec. 7, 1965, Ser. No. 512,608
Claims priority, application Italy, Apr. 12, 1965,
8,134/65
U.S. Cl. 240—9
Int. Cl. F21s 1/14, 3/14
10 Claims

ABSTRACT OF THE DISCLOSURE

A branched electricity-distributing system comprises a plurality of connectable grooved profile elements, and joint means for connecting such profile elements in longitudinal alignment with one another and to a supporting surface.

---

This invention relates to electricity distributing lines and more particularly to electricity distributing lines enclosed in grooved profiles for domestic and other uses, for example, in houses, schools, hospitals, or office buildings.

According to the present invention there is provided a branched electricity distributing system comprising one or more channelled elements connected to each other, wherein every branch is composed of connectible grooved profile elements and is fixed at its end or ends by sustaining joints, said grooved elements being shaped so as to constitute a covering for electric lines or cables of the system.

An illustrative embodiment of the invention will now be particularly described with reference to the accompanying drawing wherein;

FIG. 1 shows in plan view a generic form of an electricity distributing system with a grooved profile for any kind of civil use;

FIG. 2 represents in a perspective view such an electricity distributing system;

FIGS. 3 and 4 show two elements of different sizes, each one with a light diffusion appliance;

FIG. 5 is a cross-section of a grooved sectioned profile showing the utilization of the spaces therein;

FIG. 6 relates to an expandable portion intended to compensate for the variations in length of several elements of the grooved profile when assembled;

FIGS. 7 and 8 respectively are a perspective and a cross-sectional view showing the internal formation of a grooved profile element supporting a fluorescent lamp, with a diffuser;

FIGS. 9 to 12 show in a perspective view several modes of combining the grooved profile elements;

FIGS. 13 and 14 represent two different ways of fixing a joint at the ceiling while FIG. 13 is a clamping system for joining said element with said joint;

FIG. 15 represents a method of leveling the joints;

FIGS. 16 to 18 represent successive steps in the setting up of the grooved profile element units;

FIG. 19 shows a method of installing a descending power distributing line;

FIG. 20 is the final disposition of a grooved element provided with a diffuser for lighting purposes;

FIG. 21 represents a grooved profile for ceilings with an irregular surface;

FIG. 22 represents the means for mounting the grooved profile element as shown in FIG. 21;

FIG. 23 shows a method of mounting the grooved profile element when it is supported by means of sustaining rods or the like;

FIGS. 24–27 represent methods of mounting the grooved profile elements to overhead rods built into a building;

FIGS. 28 and 29 represents a safety device which operates when the diffuser is removed from the grooved profile elements.

In said drawing FIG. 1 shows a room 1 provided at its ceiling with a system of grooved profile elements in longitudinal and transverse positions, 2 and 3 respectively. Electric conductors for the distribution of the electric power to the utilizing apparatus or lighting centers are located in the grooved elements.

As shown in FIG. 2, the grooved element system may be composed of one or more branches connected to each other by a T joint or by a right angle joint as shown in 6 and 7.

Each branch consists of a grooved profile element system composed of elements 4 consecutively assembled, and metallic sheet profile elements of equal length which are joined together by means of joints as shown at 5.

As shown in FIG. 2, some sections 4 are provided with diffusers 8 to diffuse the light from lighting tubes or bulbs inserted into the grooved profile element.

The grooved profile elements supporting the diffusers may be manufactured of an equal, common length, as shown in FIG. 3.

This is the case when using incandescent or fluorescent lamps of reduced or shortened length, but when fluorescent lamps of a larger size are required a longer diffuser may be used e.g. a diffuser of double the length as shown in FIG. 4.

FIG. 5 represents a diagrammatical cross-section of a grooved profile element showing a diffuser 8, and further illustrates a method of utilizing the space enclosed by the grooved profile element. The useful space for housing the power conductors is indicated at 9, and the space 10 can be used for equipment for feeding a fluorescent lamp, or any other appliance. The space 10 could house a transformer for feeding a descending distributing cable. The space 11 can be used to mount the diffuser and the lamp or any other elements necessary for connection to lamps or the like.

FIGS. 7 and 8 represent in greater detail a grooved element provided with diffuser and a lamp. As shown, the bottom 12 of said grooved element is made with a large aperture 13, at either end of which supporting means 14 are placed so that a plate 15 may be suspended at a higher level than the bottom 12. Beneath said plate, a recess for fixing lamps 16 for lighting purposes is obtained, e.g. fluorescent lamps, supported by conventional lampholders 17, the bodies of which are attached through holes 18 bored in the plate 15 and the bases of which rest on the plate 15. This disposition permits the easy arrangement, control and replacement of the lamps after the diffuser 8 has been removed from its supporting frame. The diffuser may be replaced in its position by applying pressure to the diffuser so that a flange 19 around the top of the diffuser snaps over the edge of the aperture 13. In this way, the diffuser 8 can be easily positioned or removed in the manner illustrated in FIG. 20.

The closing element consists of a metallic sheet piece 20 of larger cross-section in order to allow a standardized grooved profile element 4 to be introduced therein, another grooved profile element is similarly attached at the other end. This subsidiary grooved closing element 20 serves as a compensating member where differences occur in the lengths of the grooved profile elements which are not exact multiples of the standard grooved profile element 4. This compensation is obtained by using as many standardized grooved elements as is necessary to form the whole line required, and then any difference is compensated by means of the grooved closing element 20. The rim 22 of the grooved closing element 20 serves to hold in place both the connecting members 4 and 21.

FIG. 9 shows a joint 5 used to join two consecutive elements 4. The joint is made of a metallic sheet, shaped so as to form an upper wall 23 and two parallel channels 24, 25 in which the electric wires are enclosed. The upper wall 23 is provided with an aperture 24, through which a plate 25 may be passed and beneath which the plate 25 may engage the joint by turning the plate 25 through an angle of 90°. On the upper wall 23 there are further provided two holes 26, 27 shaped as a rhomboid, with two corners placed on the middle axis of the joint, these holes serving to align exactly the joint when it is set up.

Channels 24 and 25 are delimited by parallel walls 28 and 29.

The joint illustrated in FIG. 9 is used to join two grooved profile elements arranged together, and similarly FIGS. 10 to 12 illustrate arrangements for joining one or more grooved profile elements. In FIG. 10, two joints 5 are disposed so as to form a right angle, and they are held in place by right angle locking piece 31 which is assembled after the joints have been fixed to the ceiling.

The "T" locking piece 32 joins three grooved profile elements.

In FIG. 12 four joints are held by a joining metallic cruciform piece 33.

As may be observed in FIG. 11, two consecutive elements 4 are coupled on the joint so as to contact each other at their edges on the medium transversal plane thereof.

In FIG. 13 is illustrated the manner of fixing a grooved profile element, as well as the method of fastening the joint to the ceiling. Each one of the grooved profile elements 4 covers by its own end position one longitudinal half of the joint 5. Each grooved profile element is provided at its end portion with a bracket 34 which is lodged between both walls 28, 29 of the joint. A supporting bar 35 passes through a hole of said bracket 34; this supporting bar 35 has at its end an elongated hole 36; a bolt 37 engages this hole to which is fixed a retainer bar 30 this being rotatable so as to rest on the upper edge of the walls 28 and 29 of the joint, thus ensuring the firm suspension of element 4.

The bar 30 may be turned to be set to longitudinal direction in respect of the joint, so as to be placed between the aforesaid walls 28 and 29. The rotation of the supporting bar 35 also allows the rotating movements both of the retainer bar 30 of the supporting bar 35 itself, and these actions may be carried out by means of an appropriate tool, which is introduced through a hole 38 bored at the bottom of the element 4.

A packing 39 is used to ensure the necessary sustaining action of bar 35 so as to hold the bar 30 onto the respective walls, without any play. A spring 40 serves to hold the bar 30 constantly in its upper position during setting up.

For fastening the joint to the ceiling 41, plate 25 is placed thereon and is fixed by means of a nail 42 of the expansion kind.

The joint is disposed so that it may pass over the plate 25 and then the plate can be turned through a 90° angle, thus engaging the joint from below. The joint can then be positioned in a correct alignment to take the groove profile elements and then finally the nail is hammered home.

To fix the joint 5 directly to the ceiling there has to be taken into consideration that the grooved elements 4 will have to be put in contact with the ceiling itself. When on the contrary, said grooved element has to be disposed at a lower level in respect of the ceiling, the method of FIG. 14 can be applied. Referring now to this figure, plate 25 is fixed to the joint 5, but in transversally aligned position to the aperture 24 and is locked in place by means of two screws 43 through holes 44 of the upper wall 23 of the joint. From this plate a rod 45 projects upwards, which has its upper end threaded, and may be fastened to a stirrup 46 by means of a disc 47 or its equivalent. Stirrup 46 is provided at its upper part with an elongated hole 48 through which one or more nail(s) or screw(s) passes, e.g. nail(s) of the expansion kind, for fixing to the ceiling.

When said stirrup has been fixed to the ceiling, it may be protected by a housing 49, as shown in broken lines, and provided with a lower bushing 50 which is screwed on the threaded portion of rod 45.

Preferably, for fixing said threaded rod 45 to said stirrup 46 an internally threaded disc 47 with knurled outer periphery is used, the outer diameter of which is larger than the width of the lower horizontal portion of the stirrup so that the disc 47 can be screwed up and down with the fingers in order to easily adjust the height of joint 5.

As shown in FIGS. 10 through 20 in order to install a series of standardized grooved elements 4 the joints 5 are first established at the required distances, then, as in the case of FIG. 15, the level of all joints is adjusted by screwing or unscrewing said knurled and threaded discs 47 until all the joints are at the same level as illustrated by the horizontal broken line in said figure.

After this setting the electric wires are introduced into the grooves 28' and 29' of the single joints 5, as illustrated in FIG. 16.

Then, the grooved profile elements are set up with the relevant lighting centers and power distribution points. For the latter electric connections 51 for the descending cables 52 are provided. In FIG. 19, a cable 52 is clasped by a transverse clasping means 53 which rests on a small collar 54 so as to impede the snatching away of the cable under tension and consequently its loosening from the electric connection.

When all connections have been effected, and the electric lamps put in place, the diffusers 8 are mounted in order to complete the system.

The descending cables 52 may terminate by a socket 55 for the insertion of the plug of an electric appliance or machine or they may be directly connected with the same.

In cases where a ceiling 56 has an irregular surface 57, a member 58 of profiled material for example metal sheet is provided. The joints 5 are fastened to this member by means of screws 59 which are screwed into the flanges of the member 58. This member 58 is directly fixed to the ceiling or floor by means of nails 60, passing through holes of said member and the heads of which engage washers 61. In this way all the joints 5 are obtained.

Of course, members 58 may be made to any useful length, but here they are manufactured in standardized lengths and used in the system as a multiple number of single pieces.

As represented in FIG. 23, the member 58 in the case of a beam across the ceiling may be suspended by means of rods 45 of the kind shown in FIG. 14. Said rods are provided with stirrups 46 and sleeves 49. The member 58 is attached to the rod by means of bushings 62 and 63 which are screwed by their threaded ends to the rod on either side of the member 58. Joints 5 are fixed to member 58 by means of screws 59, as indicated in FIG. 22.

In the case of FIG. 24 the grooved system is suspended by sustaining rods 64 of a building. In this case, rods 45 are suspended from clamping means 65 which are tightened on rods 64, while the member 58 and the joints 5 are fastened in the same manner as shown in FIG. 23.

As represented in FIG. 25, a clamping means 65 may be provided with a threaded bolt 66, and the member 58 is fixed by means of washers 62 and 63. Joints 5 are fixed in the same manner as shown in FIGS. 22 and 23. This disposition is preferred when no obstacles between the pulling rods require a lowering of the level of member 58.

In FIG. 26 the clamping means consists of a stirrup, held in position by means of a screw 67 while bolt 66 (or rod 45) is suspended at the bottom of said stirrup.

As shown in FIG. 27, the clamping means 65 can directly suspend the joint 5. To permit this the bolt 66 is attached to the plate 25 which is stopped from rotating by means of two subsidiary screws 70 and 71.

As represented in FIGS. 28 and 29, elements 4, supporting lamps and a diffuser 8, are provided with a safety device having a double purpose to engage said diffuser and to break the electric circuit each time the diffuser has to be opened in order to gain access to the lamps therein enclosed. To this end, a screw 72 with enlarged head engages a supporting means 73. The screw when screwed in has its head brought almost in contact with the flange 74 of said diffuser so as to impede the removal of the diffuser 8.

The screw 72, when fully screwed in, presses the small lever 75 of a switch 76, opposing the action of a spring 77. In this maner, the switch closes the electric circuit, thus igniting the lamps.

When the diffuser 8 has to be removed screw 72 must be unscrewed. The screw 72 permits the switch 76 to open due to the action of the spring 77, thus breaking the circuit.

What I claim is:

1. In a system of the character described, a combination comprising a plurality of coupling members of substantially U-shaped cross-section, said coupling members being adapted to be mounted on a support surface spaced from and aligned with one another so that their respective open sides face away therefrom and including a transverse wall facing such support surface and a pair of side walls extending from said transverse wall and each defining an open channel so that, when said coupling members are mounted on such support surface, electric wires may be installed on said surface by being inserted through the channels of the respective coupling members and by being thereby supported by such coupling members and unsupported intermediate the same; and a plurality of elongated open-ended channel-shaped duct members each having an unobstructed side and being adapted to be releasably connected to said coupling members in end-to-end relationship with one another and in overlapping relationship with said coupling members with the open side of each duct member facing said support surface, whereby each duct member is releasably connected to two adjacent ones of said coupling members bridging the space therebetween and concealing the unsupported electric wires in said space.

2. A system as defined in claim 1; and further comprising diffuser means provided on at least selected ones of said duct members and facing away from said support surface, so that light originating within the respective duct member radiates through and is diffused by such diffuser means.

3. A system as defined in claim 2; and further comprising a light source associated with and located within each of said selected duct members.

4. A system as defined in claim 3; and further comprising locking means associated with said selected duct members and operative for locking said diffusers to the respective duct members and for simultaneously effecting a connection of the respective light source with the electric wires in said duct members in electrically conductive relationship therewith.

5. A system as defined in claim 1; and further comprising connecting means operative for connecting said coupling members to the respective duct members.

6. A system as defined in claim 5, wherein said connecting means comprises a plurality of sets of connecting members respectively associated with one of said duct members, each set including two connecting members turnably mounted within the respective duct member at the opposite ends thereof, and operating means associated with the respective connecting members for turning the same and accessible from the exterior of the duct member, said connecting members being turnable into and out of locking engagement with said side walls of the respective coupling member when a duct member is positioned in overlapping relationship therewith.

7. A system as defined in claim 5, said channels extending along said open side transversely spaced from and in parallelism with one another; and wherein said connecting means is positioned intermediate said channels.

8. A system as defined in claim 5; further comprising bracket means provided at the opposite ends of the respective duct members; and wherein said connecting means engages said bracket means and the walls of respective duct members.

9. A system as defined in claim 5; further comprising stirrup means mounted on said support surface; and rod means associated with stirrup means and said coupling members and operative for connecting the latter, and thereby said duct members, to said support surface in spaced relationship therewith.

10. A system as defined in claim 9, said rod means being adjustable for varying the spacing of said coupling members and duct members from said support surface.

References Cited

UNITED STATES PATENTS

| 2,446,736 | 8/1948 | Biller | 174—64 XR |
| 2,625,646 | 1/1953 | Goebel | 240—9 |
| 2,818,497 | 12/1957 | Alden. | |
| 2,840,690 | 6/1958 | Harling | 240—66 XR |
| 2,988,633 | 6/1961 | Rosenfield | 240—9 |
| 3,019,332 | 1/1962 | Schiffer | 240—9 |
| 3,094,584 | 6/1963 | Liberman et al. | 174—64 XR |
| 3,135,469 | 6/1964 | Hanson | 240—51.11 XR |

FOREIGN PATENTS

| 563,733 | 8/1944 | Great Britain. |
| 853,619 | 10/1952 | Germany. |
| 137,488 | 10/1952 | Sweden. |

NORTON ANSHER, *Primary Examiner.*

J. F. PETERS, JR., *Assistant Examiner.*

U.S. Cl. X.R

174—64, 41, 48; 240—78, 85